United States Patent [19]
Gealt

[11] 3,867,687
[45] Feb. 18, 1975

[54] SERVO GAIN CONTROL OF LIQUID CONDUCTIVITY METER

[75] Inventor: Arthur E. Gealt, Philadelphia, Pa.

[73] Assignee: Honeywell Inc., Minneapolis, Minn.

[22] Filed: Mar. 19, 1973

[21] Appl. No.: 342,774

Related U.S. Application Data

[63] Continuation of Ser. No. 199,795, March 1, 1971.

[52] U.S. Cl................ 324/30 R, 318/634, 318/650, 318/663, 324/99 R
[51] Int. Cl.............................................. G05f 1/10
[58] Field of Search...... 324/99 R, 30 R, 30 B, 100, 324/132; 318/634, 650, 663, 667

[56] References Cited
UNITED STATES PATENTS
3,281,685  10/1966  Talbot, Jr. .......................... 324/100
3,296,529  1/1967  Sundstrom .......................... 324/132

*Primary Examiner*—B. Dobeck
*Attorney, Agent, or Firm*—Arthur H. Swanson; Lockwood D. Burton; Mitchell J. Halista

[57] ABSTRACT

A liquid conductivity measuring instrument uses a sensing cell having energizing and measuring electrodes and includes a variable gain servo system which is regulated by an attenuator. The attenuator circuit is responsive to a variation in the energizing current of the sensing cell and is arranged to provide a variable impedance signal shunting path for a servo drive signal.

10 Claims, 1 Drawing Figure

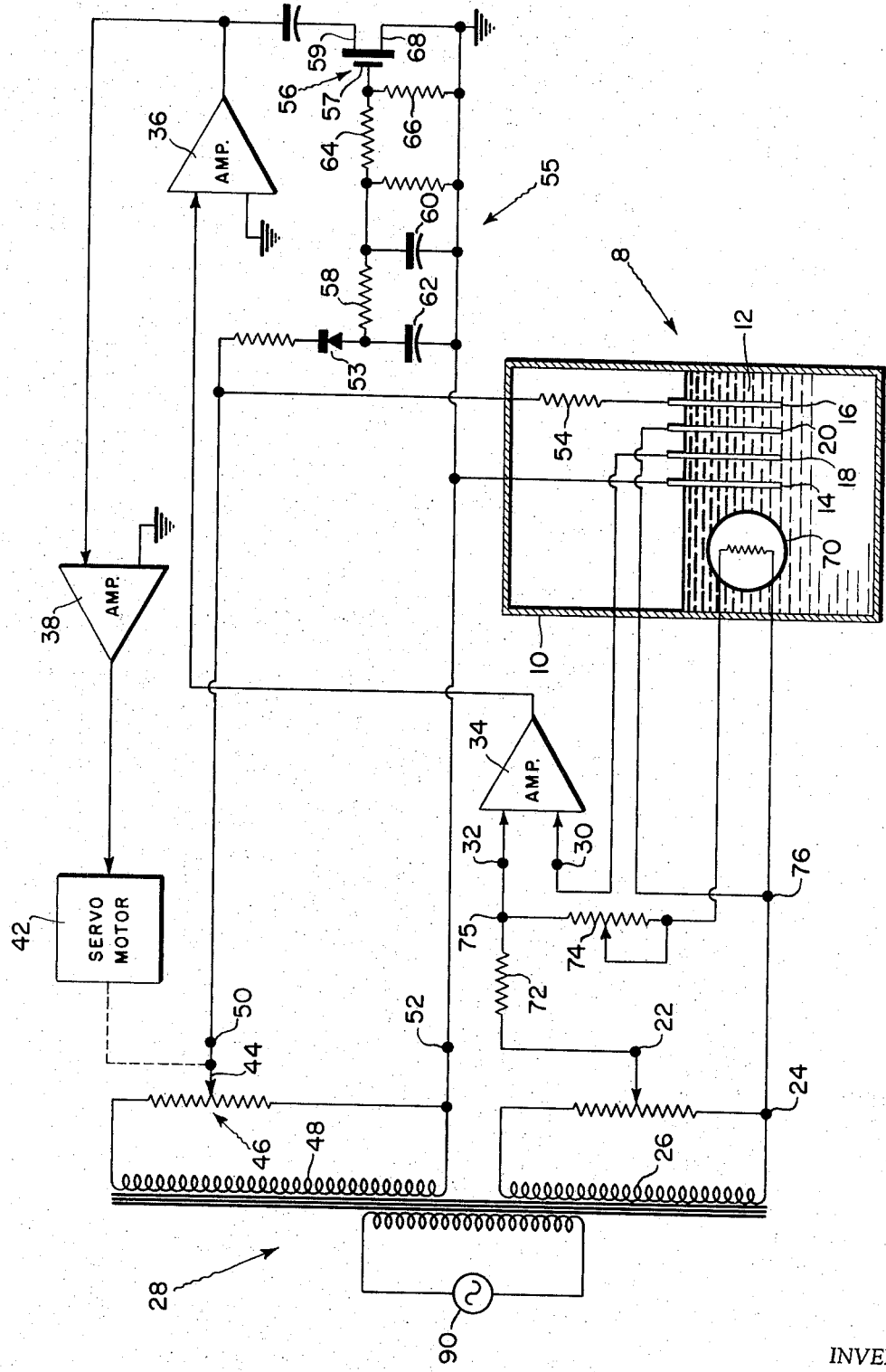

SERVO GAIN CONTROL OF LIQUID CONDUCTIVITY METER

This is a continuation of application Ser. No. 199,795, filed on Mar. 1, 1971.

This invention relates to improvements in the servo control of physical quantity measuring meters. Particularly, this invention relates to the electronic circuitry for varying the amplifier gain of the servo of a liquid conductivity meter as a function of the conductivity of the sample under test and of the readout scale position.

In measuring systems used to measure a physical quantity wherein the measured quantity has a reciprocal relationship to the actual physical data of interest, e.g., resistivity versus conductivity, optical transmissivity versus optical density, or opacity, etc., the measurement of the measured quantity toward the low end of the measuring scale gives rise to a non-linear increase in sensitivity of the measuring circuit with respect to a measurement toward the high end of a measuring scale. For example, the measurement of conductivity by direct measurement of resistivity by a circuit using a servo to vary the energizing current supplied to a resistivity measuring transducer has such a non-linear relationship wherein a scale increment of unbalance of any size represents a much larger fractional change in the transducer energizing signal at the low end of the measuring scale where the total signal is small than it does at the high end of the measuring scale. In order to obtain conductivity readings which are linear with conductance instead of with resistance, the present invention is directed to a circuit for progressively desensitizing the servo toward the low end of the measuring scale by decreasing the effective means of the servo system. In other words, the slope of the null signal used to balance the change in resistivity by the servo varies according to the position of a potentiometer slider contact so that if the transfer functions of the other elements in the servo loop are unchanged, the overall servo loop gain will vary according to which portion of the slidewire is being contacted by the movable slider. Thus, a given servo motor drive for the potentiometer contact will produce different error signal inputs into the servo loop according to the position of the slider contact. These error signal changes in overall loop gain adversely affect the performance of the servo system since excessively high signals produced by a steep slope of the slidewire change saturate the loop amplifiers and produce system instabilities while the low signal amplitudes produced by gradual slope changes of the slidewire signal produce ineffective operation of the servo loop with the resultant inaccuracies in movements of recording devices.

It is accordingly a primary object of this invention to produce a non-linear recorder system wherein accurate and stable operation of the servo system is maintained regardless of the non-linear nature of the slidewire output signal.

It is accordingly an object of the present invention to provide an improved liquid conductivity meter servo system which obviates the foregoing deficiencies of the prior art apparatus.

It is another object of the present invention to provide a variable gain servo system.

It is a further object of the present invention to provide a constantly variable gain servo system.

It is yet another object of the present invention to provide the constantly variable gain servo system by means of a field effect transistor (FET) functioning as a linear variable resistance.

It is yet a further object of the present invention to provide a four element liquid conductivity meter with high accuracy and fast response.

In accomplishing these and other objects there has been provided, in accordance with the present invention, an improved liquid conductivity meter using gradient voltage measuring electrodes to measure the conductivity of a fluid sample. The servo system has its loop gain continuously varied by an FET circuit in the forward loop of the servo amplifier. The conductivity of the FET is continuously varied as a function of an output variable.

A better understanding of the invention may be had from the following detailed description when read in connection with the following drawing, in which:

The single FIGURE is a schematic diagram illustrating an embodiment of the present invention.

Referring now to the drawing in more detail, there is shown a cell 8 having a container 10 holding a fluid 12 under test. Immersed in the fluid 12 are two pairs of electrodes. The first pair of electrodes, energizing or current electrodes 14 and 16, are connected to a power source, i.e. a power transformer 28, to be described later. An electric circuit is completed and current flows through and sets up a voltage gradient in the fluid 12. The second set of electrodes, measuring electrodes 18 and 20, are selectively located in proximity to the energizing or current electrodes 14 and 16. The measuring electrodes 18 and 20 sense the voltage gradient in the fluid 12 set up by the current flowing between the energizing electrodes 14 and 16. With any variation in the current passing through the energizing electrodes 14 and 16, the voltage gradient in the fluid 12 monitored by the measuring electrodes 18 and 20 will vary in a proportional manner.

The gradient voltage monitored by the measuring electrodes 18 and 20 is compared with a reference voltage across nodes 22 and 24 which is derived from the outputs of a reference voltage secondary winding 26 of the power transformer 28.

The A.C. reference voltage signal across the nodes 22 and 24 is compared with, subtracted from (algebraically added to), the voltage signal across the measuring electrodes 18 and 20. The connections between the reference voltage signal across the nodes 22 and 24 and the voltage signal across the measuring electrodes 18 and 20 are made in series, the respective voltage signals being 180° out of phase with respect to one another. Therefore, if the reference voltage signal across the nodes 22 and 24 is of a magnitude equal to the voltage signal across the measuring electrodes 18 and 20, the voltage signal at input nodes 30 and 32 of an amplifier 34 will be zero.

If the voltage gradient monitored by the measuring electrodes 18 and 20 were to change while the reference voltage across the nodes 22 and 24 remains constant, a finite difference signal would be present at the input of the amplifier 34. The output signal from the amplifier 34 is applied as input signal to an amplifier 36. The output of the amplifier 36 is connected to a power amplifier 38 and also to a variable impedance FET attenuator circuit to be described later. An output of the amplifier 38 is connected to and drives a servo motor 42 which, in turn, drives a slider or wiper 44 of a slidewire 46 which has the characteristics of a variable impedance transducing circuit. The slidewire 46 is connected across a secondary winding 48 of the power transformer 28. Voltage signal across the slidewire 46, at the node 50 is connected through a resistor 54 to the current electrode 16. The node 52 is connected directly to the current electrode 14. The resistor 54 is chosen sufficiently large in magnitude such that it is the principle impedance in the combination of the power transformer 28, the slidewire 46, and the resistor 54 which forms a current source for feeding the energizing or current electrodes 14 and 16. The servo motor 42 and the slidewire 46 are connected in such a relationship that an increase in the gradient voltage monitored by the measuring electrodes 18 and 20 will result in a decrese in the voltage signal across the output nodes 50 and 52. Therefore, the flow of current through the energizing or current electrodes 14 and 16 and the fluid 12 will decrease. This decrease will in turn decrease the voltage gradient between the measuring electrodes 18 and 20 until the voltage gradient and the reference signal balance to substantially zero. The servo system so adjusts the current flow through the fluid 12 that the voltage gradient between the measuring electrodes 18 and 20 is held at a predetermined value determined by the magnitude of the reference voltage across the nodes 22, 24.

In addition, the output nodes 50 and 52 are connected to a rectifier 53 and a smoothing circuit 55 which feeds a gate electrode 57 of an FET 56. A resistor 58 and capacitors 60 and 62 of the smoothing circuit 55 are chosen as to give maximum response concomitant with acceptable ripple. Oscillation and chatter of the servo motor 42 is thereby alleviated. Output voltage divider resistors 64 and 66, forming part of the smoothing circuit 55, are chosen in order to utilize the full dynamic range of the FET 56. As the AC voltage signal across the output nodes 50 and 52 of the slidewire 46 increases, a rectified and smoothed DC signal from the output of the smoothing circuit 55 also increases. However, this latter increase is negative with respect to the source electrode 68 of the FET 56 i.e., an increase in the negative direction with respect to the potential level on the source electrode 68. The FET 56 is thereby driven out of its highly conducting mode and toward its cutoff mode i.e., from a state offering a low impedance path to an output signal from the amplifier 36 to a state presenting a high impedance path to the output signal from the amplifier 36. The FET 56 acts as a variable resistance or conductance attenuator for the signal at the output of the amplifier 36 i.e., the input signal applied to the amplifier 38 is affected in proportion to the bypass impedance offered by the FET 57. The forward current path of the amplifier combination comprises the amplifiers 34, 36 and 38. Thus, a gating voltage derived from the output of the slidewire 46 and node 50 and used to drive the sensor 8, is used to control the FET 56 between its cut-off and saturation levels to selectively shunt input signal from the amplifier 36 whereby substantially uniform sensitivity of the servo system is provided across the full measuring range of the sensor 8 and the slidewire 46. Since the voltage signal across the nodes 30 and 76 is a function of the output signals the slidewire 46 across its nodes 50 and 52, the aforesaid attenuation of the output signal from the amplifier 36 by the variable impedance of the FET 56 is effective to compensate the output signal from the slidewire 46 as it is adjusted by the servo drive 42.

In order to adjust for the temperature variation of a sample under study a thermistor 70 is measured in the fluid 12 sensing the temperature thereof. One end of a resistor 72 is connected to the node 22 and the other end is connected to a variable resistor 74 which, in turn, is connected to the thermistor 70. The other end of the thermistor 70 is connected to the power transformer 28. A terminal 75 is located on the connection between the resistor 72 and the variable resistor 74. A terminal 76 is located on the connection between the thermistor 70 and the node 24.

As the temperature increases the resistance of the thermistor 70 decreases, the current flow through the resistor 72 increase thereby decreasing the effective reference voltage signal between the terminals 75 and 76. The change in the voltage gradient as a function of temperature across the measuring electrodes 18 and 20 is thereby compensated for by the change in the effective reference voltage signal across the terminals 75 and 76.

If the voltage output from a alternating current generator 90 supplying a primary winding of the power transformer 28 varies, the output signals from the reference voltage secondary winding 26 and the secondary winding 48 both vary in the same proportion thereby compensating for the first stated variation.

The position of the slider 44 of the slidewire 46 is not only proportional to the voltage signal supplied to the current electrodes 14 and 16 but it also provides a readout position in a suitable indicator or recorder such as a strip recorder. The slidewire 46 acts as a transducer changing a position into an electrical signal.

In addition, the position of the slider 44 and the voltage signal derived therefrom can serve as an input control function for a process in which the fluid conductivity meter forms the sensing portion thereof.

Thus it may be seen that there has been provided, in accordance with the present invention, an improved variable gain servo system for measuring the conductivity of liquids. The servo system provides the variable gain by means of a field effect transistor functioning as a linear variable resistance.

The embodiments of the invention in which an exclusive property or priviledge is claimed are defined as follows:

1. A control circuit comprising:
   signal comparator means having an output means and a plurality of input means and being arranged to produce an output signal representative of the difference between signals applied to said input means,
   means for selectively controlling connected to said output means to control the amplitude of an output signal from said comparator means on said output means,
   variable energizing signal producing means connected to said output means of said comparator means and responsive to said output signal from said comparator means to produce a corresponding energizing signal amplitude,
   input signal means connected to said energizing signal producing means to receive said energizing signal and arranged to produce an output signal in response to said energizing signal, first circuit means connected between said variable energizing signal producing means and said means for selectively controlling for applying said energizing signal from said variable energizing signal producing means to said means for selectively controlling to control the amplitude of an output signal from said signal comparator means, second circuit means connected between said input signal means and one of said input means of said signal comparator means to apply said output signal from said input signal means as an input signal to said one of said input means of said comparator means, reference signal means, and third circuit means connected between said reference signal means and another one of said input means of said signal comparator means to apply an output signal from said reference signal means to said another one of said input means of said signal comparator means to be compared with said output signal from said input signal means.

2. A control circuit as set forth in claim 1 wherein said means for selectively controlling includes a field effect transistor having source and drain electrodes arranged to provide a shunt path for said output signal from said signal comparator means and a gate electrode connected to said first circuit means.

3. A control circuit as set forth in claim 1 wherein said variable energizing signal producing means includes a servo means having an input means connected to said output means of said signal comparator means and a servo output means, and a slidewire means having a slider arranged to be driven by said servo output means and connected to said first circuit means.

4. A control circuit as set forth in claim 1 wherein said input signal means includes sensor means having energizing signal input terminals connected to receive said energizing signal and output signal terminals connected to said second circuit means.

5. A control circuit as set forth in claim 4 wherein said sensor means is a cell for measuring electrical conductivity of an aqueous sample and includes a pair of energizing electrodes arranged to receive said energizing signal and a pair of measuring electrodes connected to said output signal terminals.

6. A control circuit as set forth in claim 5 and including temperature compensating means arranged to be immersed in said aqueous sample and connected to said reference signal means to control the amplitude of an output signal from said reference signal means in response to temperature variations of said aqueous sample.

7. A control circuit as set forth in claim 6 wherein said compensating means includes a thermister immersed in said aqueous sample.

8. A control circuit as set forth in claim 1 and including means for concurrently energizing said variable energizing signal means and said reference signal means.

9. A control circuit as set forth in claim 3 and including means for concurrently energizing said slidewire means and said reference signal means.

10. A control circuit as set forth in claim 1 wherein said first circuit means includes a serial connection of a rectifying means, a filter means and a voltage divider means between said variable energizing signal means and said gate electrode.

* * * * *